(12) United States Patent
Fisher (10) Patent No.: US 6,411,960 B1
(45) Date of Patent: Jun. 25, 2002

(54) COMPUTER SYSTEM

(75) Inventor: Patrick W. E. Fisher, Pantmawr (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/299,588

(22) Filed: Apr. 27, 1999

(30) Foreign Application Priority Data

Mar. 31, 1999 (GB) .............................................. 9907490

(51) Int. Cl.$^7$ .............................................. G06F 17/30
(52) U.S. Cl. ........................ 707/102; 345/760; 345/781
(58) Field of Search ........................ 707/9, 104, 104.1, 707/513, 514, 523, 102; 705/26; 345/760, 781, 764

(56) References Cited

U.S. PATENT DOCUMENTS

| | | | | |
|---|---|---|---|---|
| 5,680,470 A | * | 10/1997 | Moussa et al. | 382/119 |
| 5,802,518 A | * | 9/1998 | Karaev et al. | 707/9 |
| 5,864,871 A | * | 1/1999 | Kitalin et al. | 707/104 |
| 5,890,175 A | | 3/1999 | Wong et al. | |
| 5,897,622 A | * | 4/1999 | Blinn et al. | 705/26 |
| 5,969,716 A | * | 10/1999 | Davis et al. | 345/328 |
| 6,075,193 A | * | 6/2000 | Aoki et al. | 84/609 |

FOREIGN PATENT DOCUMENTS

| | | |
|---|---|---|
| EP | 0858041 A2 | 8/1998 |
| WO | WO 98/14896 | 4/1998 |

OTHER PUBLICATIONS

Database WPI Week 199936, Derwent Publications Ltd., London, GB; AN 1999–430270, XP002124849, "Computer System for Automatically Organizing Contents" & WO 99 34303 A (Rip Japan Co Ltd), Jul. 8, 1999.
Patent Abstracts of Japan, vol. 1999, No. 04, Apr. 30, 1999 & JP 11 015723 A (Nec Corp), Jan. 22, 1999.
Chahuneau et al: "SGML Template Driven Database Extraction: A New Approach to Report Generation", Internet, 'Online' Jul. 21, 1998, pp. 1–7, XP002124848, Retrieved from the Internet: URL:http://www.oasis–open.org/cover/chahuneauSGML96.html 'retrieved on Dec. 6, 1999'.
Kristensen, "Template Resolution in XML/HTML", Computer Networks and ISDN Systems, NL, North Holland Publishing, Amsterdam, vol. 30, No. 1–7, p. 239–249, XP004121423.

* cited by examiner

*Primary Examiner*—Hosain T. Alam
*Assistant Examiner*—Tam V Nguyen
(74) *Attorney, Agent, or Firm*—Nixon & Vanderhye PC (57) ABSTRACT

An electronic catalogue is implemented on a server computer by a software component which functions as a catalogue system and an associated database. The catalogue contains details on a set of individual products. The database contains a set of tables, which contain data items relating to the products. A set of first, second and third order templates are also stored in the database. Each second order template is subordinate to an associated first order template and each third order template is subordinate to an associated second order template.

The electronic catalogue can be accessed via the public Internet from a client computer. When the user of the client computer wishes to retrieve information on a particular product, the client computer transmits a request to the server computer. The server computer uses the request to retrieve a first order template 150. The catalogue system then uses control information contained in the first order template 150 together with a request received from the client computer to search the tables in its database for data items relating to the selected product. Control information in the tables searched also specify a set of second order templates 152, 154, 156, 158 and 160, and a set of third order template 162, 164, 166, 168 and 170. These templates are retrieved by the catalogue system from the database. It then uses the retrieved data items together with the retrieved templates to create an information page containing data on the selected product. In this information page, the first order template 150 defines the overall format of the page, the second order template defines the format of respective parts of the page and each of the third order template defines the format of a portion of a part of the page covered by an associated second order template 160.

6 Claims, 10 Drawing Sheets

COMPUTER SYSTEM

BACKGROUND OF THE INVENTION

1. Field of the Invention

This invention relates to a method of generating an information page in a computing system and also to a computing system arranged to generate such a page.

2. Description of Related Art

In a presently known method of generating an information page in a computing system which has a database, a search is performed on the database to extract a set of data items which are then inserted into a fixed template to create an information page. This method has the disadvantage that it is difficult to produce variations in the layout and format of the information pages which are created.

SUMMARY OF THE INVENTION

According to one aspect of this invention, there is provided a method of generating an information page in a computer system, said computing system including a database stored on said computer system, said database comprising a set of templates and a set of data tables each of which contains a set of data items, said method comprising the steps of selecting a first order template, performing a search on said database using at least one input parameter to retrieve a set of data items, selecting at least one second order template, the or each second order template being subordinate to the first order template, and creating an information page containing the data items retrieved in the search, the first order template defining the overall format of the information page, and the or each second order template defining the format of an associated part of the information page.

The method of this invention has the advantage that it provides flexibility in the layout and format of the information pages which are created and an improvement in the visual impact of the individual pages.

Preferably, in said step of selecting at least one second order template, the or each second order template is selected by using control information contained in one of said tables.

The method may also include the step of selecting at least one third order template, the or each third order template being subordinate to an associated second order template, the or each third order template defining the format of a portion of a part of the information page defined by its associated second order template.

Preferably, the parameters used to retrieve said set of data items are obtained from an input command entered by a user of said computer system and control information contained in the said first order template.

Preferably, said data tables include a first table containing data items belonging to a first class of information, a second table containing data items belonging to a second class of information, and a third table linking data items in the first table with data items in the second table.

In one embodiment of the invention, said database contains data on a set of related products or services, and the information page contains a set of data items relating to one of said products or services.

According to a second aspect of this invention, there is provided a computer system for generating an information page, said computer system including a database stored on said computer system, said database comprising a set of templates and a set of data tables each of which contains a set of data items, said computer system being arranged to perform the operations of select a first order template, perform a search on said database using at least one input parameter to retrieve a set of data items, select at least one second order template, the or each second order template being subordinate to the first order template, and create an information page containing the data items retrieved in the search, the first order template defining the overall format of the information page, and the or each second order template defining the format of an associated part of the information page.

BRIEF DESCRIPTION OF THE DRAWINGS

This invention will now be described in more detail, by way of example, with reference to the drawings in which.

DETAILED DESCRIPTION OF THE INVENTION

Figure 1:
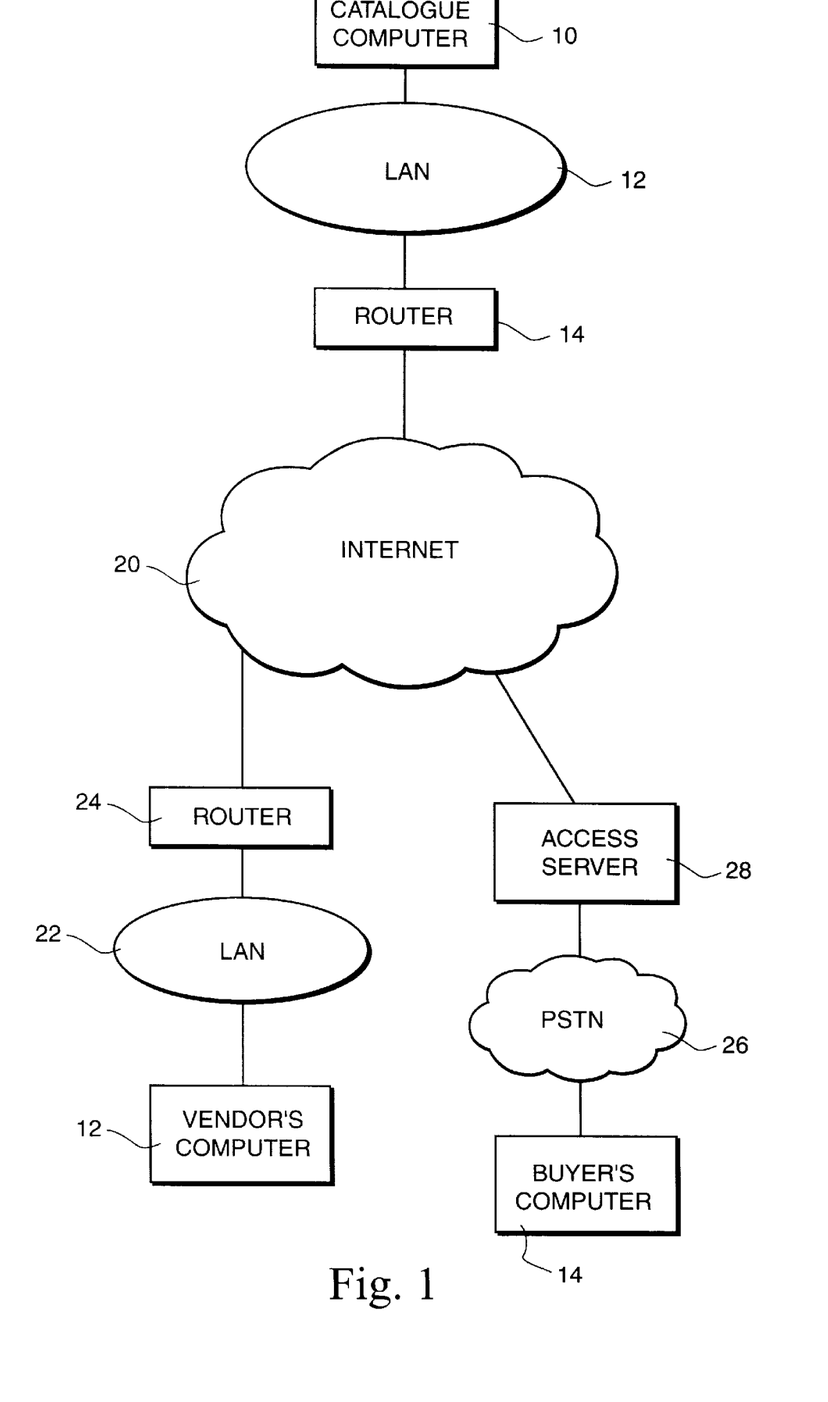
FIG. 1 is a block diagram showing a server computer which stores an electronic catalogue in accordance with this invention, two client computers and network connections between these computers.

Referring now to FIG. 1, there is shown the arrangement of a server computer 10, two client computers 12, 14 which can access the server computer 10 and the network arrangement which is used for connecting the computers 10, 12 and 14 together.

The server computer 10 stores an electronic catalogue which contains data on a set of products which are available for sale. In this example, the catalogue stores data on kitchenware products. The server computer 10 will also be referred to as a catalogue computer. This computer is owned by a provider of catalogue services. Although in this example the catalogue computer 10 stores only a single catalogue, it is appreciated that it could also store a set of catalogues of products for sale by one or more vendors. It could also be used to store a catalogue containing a set of services, such as telecommunications services, which are available from a service provider.

The client computer 12 belongs to the vendor of the products listed in the electronic catalogue and this computer will also be referred to as the vendor's computer. The vendor's computer 12 is used to load individual data items into the electronic catalogue and to edit these items.

The client computer 14 is illustrative of client computers belonging to members of the public who may wish to obtain data on the products listed in the electronic catalogue. The computer 14 will also be referred to as the buyer's computer.

As will be explained in more detail below, when the catalogue computer 10 is accessed by the buyer's computer 14, it can generate information pages relating to the products listed in the catalogue. The data items for the products are stored in a database. In order to generate an information page, a search may be performed on the data items in the database. A main or first order template, one or more second order templates and possibly higher order templates are selected. The retrieved data items and the selected templates are then used to create the desired information page. Each second order template is subordinate to the main or first order template and defines the format of part of the information pages. Each third or higher order template is subordinate to a lower order template and defines a portion of the information page within the part defined by its associated higher order template.

The connections between the computers 10, 12 and 14 will now be described. The catalogue computer 10 may be connected through a Local Area Network (LAN) 12 and a router 14 to the public Internet 20. Similarly, the vendor's computer 12 may be connected through a LAN 22 and a router 24 to the public Internet. The buyer's computer 14 may be connected through the Public Switched Telecommunications Networks (PSTN) 26 to an access server 28 belonging to an Internet service provider. The access server 28 provides a connection to the Internet 20.

Figure 2:
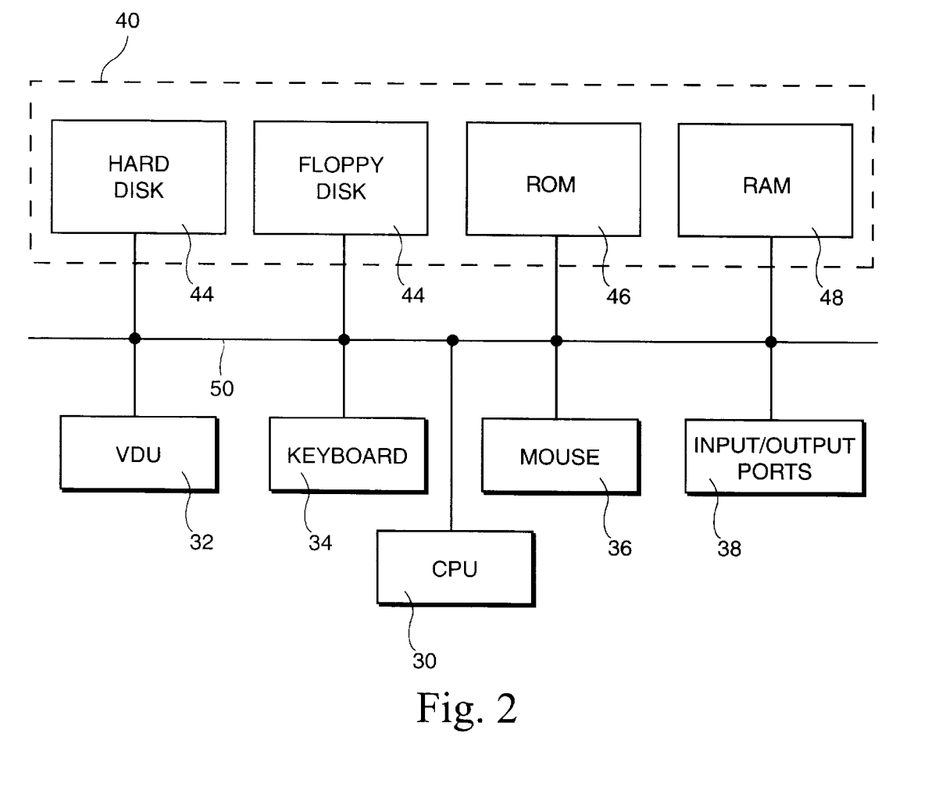
FIG. 2 shows the hardware construction of a computer.

Each of the computers 10, 12 and 14 is of conventional construction and the hardware construction of one of these computers is shown in FIG. 2. As shown in FIG. 2, the hardware components include a Central Processing Unit (CPU) 30, a Visual Display Unit (VDU) 32, a keyboard 34, a mouse 36, input and output ports 38, and a store 40 formed from a combination of hard disk storage 42, floppy disk storage 44, Read-Only-Memory (ROM) 46 and Random Access Memory (RAM) 48.

These components are connected to a central bus 50. The operating system and the programs which provide the desired functionality are stored in the store 40.

Each of the computers 10, 12 and 14 can transmit and receive data packets using the well known Transmission Control Protocol (TCP) together with the Internet Protocol (IP). Each of these computers can use the higher level protocol known as HyperText Transfer Protocol (HTTP) for transmitting and receiving information pages. Information pages which are transmitted using HTTP are stored or created using the well known HyperText Markup Language (HTML). As is well known, an HTML page usually contains one or more hyperlinks. In this example, when the user of one of the client computers 12, 14 clicks a mouse pointer on a hyperlink on an information page produced by the server computer 10 to request another information page, an associated URL is transmitted to the sever computer 10. The server computer 10 then either retrieves the requested page from fixed pages contained in its database or dynamically generates the requested information page from data items contained in its database.

Figure 3:
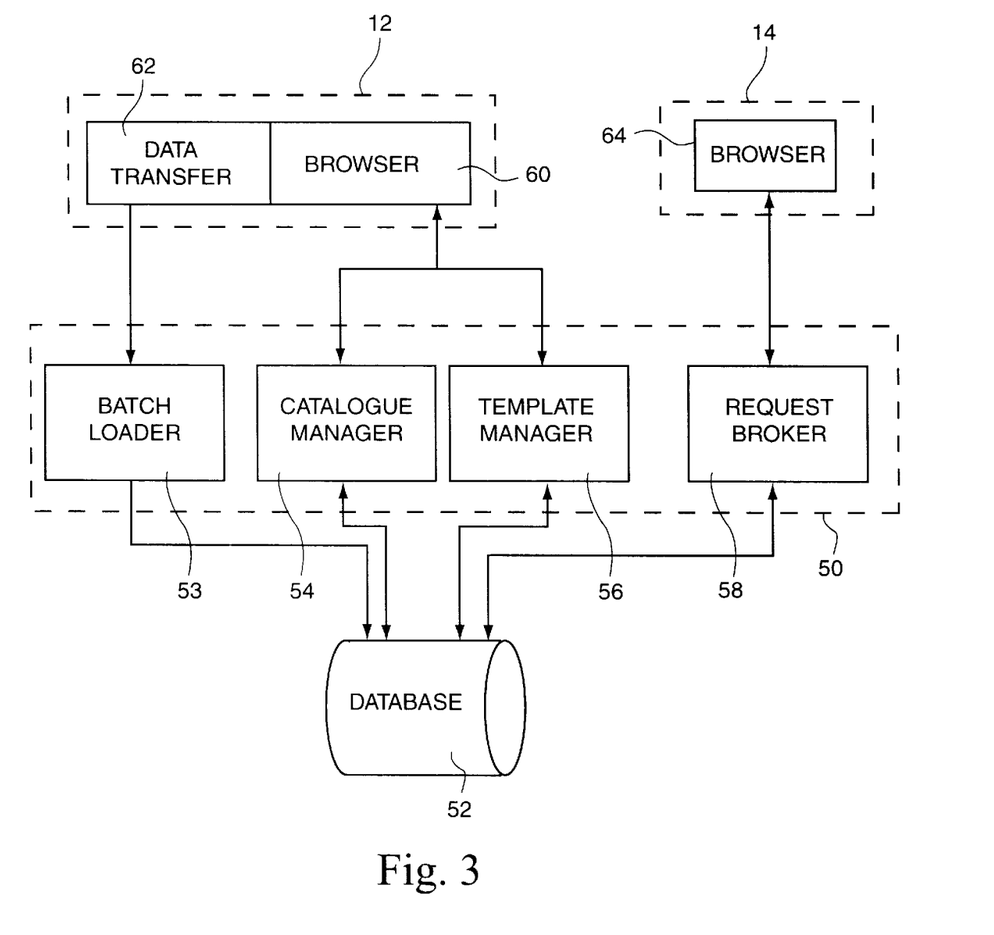
FIG. 3 is a functional block diagram illustrating the components of the server computer which provide the electronic catalogue and the components of the client computers which are used to access the electronic catalogue.

Referring now to FIG. 3, there are shown the components of the catalogue computer 10 which provide the electronic catalogue and also the components of the computers 12 and 14 which are used to access the catalogue.

The components of the computer 10 which provide the electronic catalogue comprise a catalogue system 50 and a database 52. The catalogue system 50 is implemented as a program stored on computer 10 and comprises a batch loader 52, a catalogue manager 54, a template manager 56, and a request broker 58. In this example, the database 15 is implemented as the well known ORACLE database. In the present example, both the catalogue system 50 and the database 52 are stored on the catalogue computer 10. By way of modification, the database 52 may be stored on a separate computer which is connected to the computer which stores the catalogue system 50 so as to form a computer system.

The vendor's computer 12 has a browser 60 for requesting information pages from the catalogue computer and also for editing data items and a data transfer component 62 for loading data items into the catalogue computer 10. The buyer's computer 14 includes a browser 64 for requesting information pages. The browsers 60, 64 and the data transfer component 62 are implemented as computer programs and each of the browsers is the well known NETSCAPE browser.

When the owner of the vendor's computer 12 is used to create an electronic catalogue, the data items for the catalogue are transmitted by the data transfer components 62 on the vendor's computer 12 to the batch loader 53 on the catalogue computer 10. The batch loader 53 then loads the data items into the database 52.

Using the browser 16 on the vendor's computer 12, the user of this computer can access and edit the data items via the catalogue manager 54. The database 52 contains a set of default templates which are used, in the absence of other templates, for creating information pages from data items. However, in order to create a distinctive appearance for information pages, the user of the vendor's computer 12 can access the template manager 56 from the browser 60. By doing this, the user can then create its own templates.

When the user of the buyer's computer 14 wishes to retrieve an information page, the browser 64 accesses the request broker 58. If the requested information page is a fixed page, for example the front page of a catalogue, then the request broker 52 retrieves this page directly from the database 52 and transmits it back to the browser 64. If the requested information page is to be generated from data items stored in the database 52, then the request broker 58 passes the request to the template manager 56. As will be described in more detailed below, the template manager 56 then performs a search on the data items in the database 52 to retrieve those items which are needed for the requested page. The template manager 56 also selects the templates which will be used to create the requested page and retrieve these from the database 52. The selected templates and the retrieved data items are then used to create the requested information page in the template manager 56. This page is then passed to the request broker 58 which transmits it to the browser 64.

Figure 4:
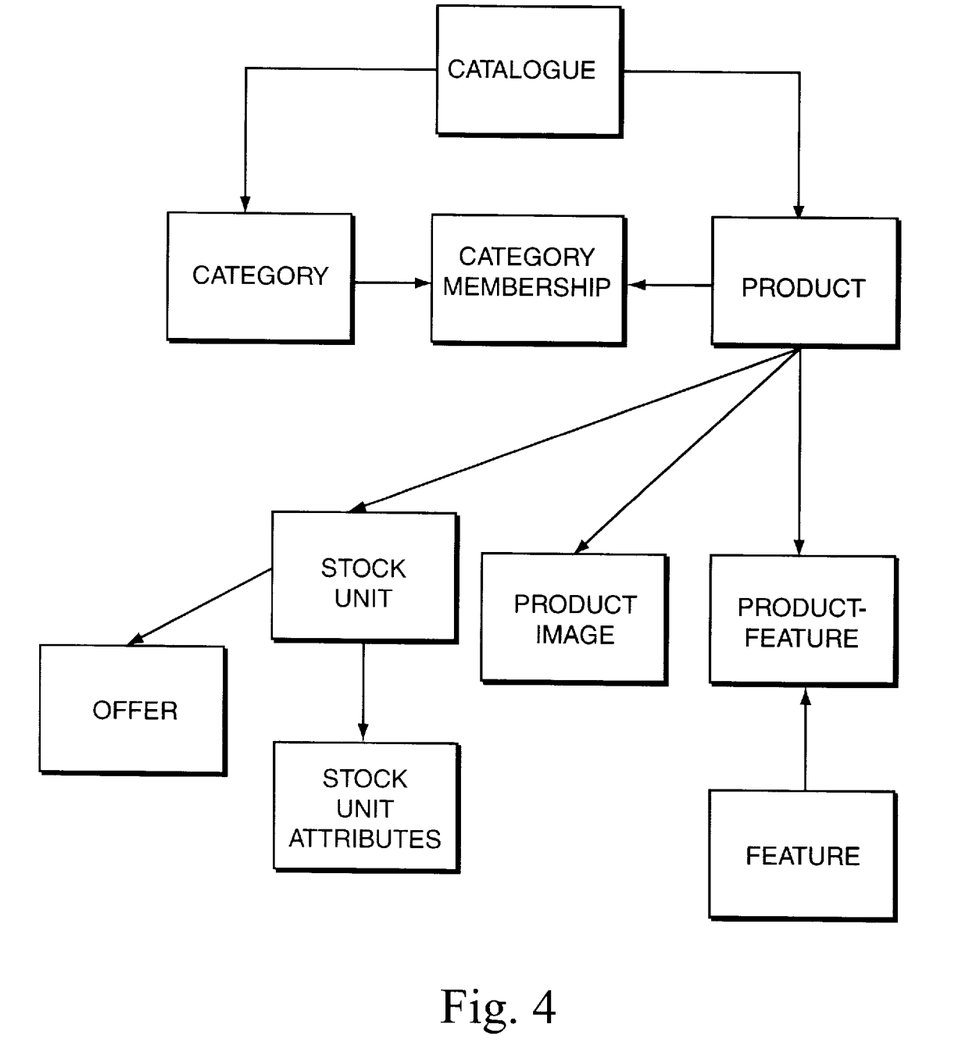
FIG. 4 is an entity diagram of tables stored in the electronic catalogue.

In the database 52, data items for the products which are for sale are stored in the form of a set of tables. Referring now to FIG. 4, there is shown an entity diagram illustrating these tables and their relationship with each other.

Referring now to FIG. 4, the catalogue has the following tables: CATALOGUE, CATEGORY, PRODUCT, CATEGORY-MEMBERSHIP, FEATURE, PRODUCT-FEATURE, PRODUCT IMAGE, STOCK UNIT, OFFER and STOCK UNIT ATTRIBUTES. The individual products are grouped into categories and data items on the individual categories are held in the table CATEGORY. By way of modification, the categories may be divided into sub-categories. With this modification there is a table for the sub-categories and a further table to link the sub-categories to the categories. For each product, a set of data items is held in the table PRODUCT. The table CATEGORY-MEMBERSHIP links the data items on the individual products with the categories. The table FEATURE contains a set of data items for each feature of the products and the table PRODUCT-FEATURE links the data items in the table FEATURE with the data items in the table PRODUCT.

For each product, the table PRODUCT IMAGE contains an identifier for the image depicting that product. Also for each product, there are one or more purchase options and the table STOCK UNIT contains a set of data items for each purchase option. In the interests of simplicity, in this example, each product has only one purchase option. For each purchase option, the table OFFER contains details of the price and other sale information and the table STOCK UNIT ATTRIBUTES contains a set of data items on the possible attributes of the purchase option, such as its colour.

The individual tables will now be described in more detail. Each table has a set of fields. Each table then has a set of individual records corresponding to the individual items, such as products or features, on which data is stored in the table. Each record comprises a set of data items or data values which are stored in the database 52 against the appropriate fields. For each table which is illustrated below, the fields are shown together with two blank columns which represent the first two records of the table.

TABLE 1

| CATALOGUE |
|---|
| FIELDS |
| SHOP NUMBER |
| SHOP NAME |
| SHOP DESCRIPTION |

The table CATALOGUE is illustrated above as Table 1. In the present example, there is only a single catalogue but, as mentioned above, the database 52 could contain a set of catalogues. The table CATALOGUE has the following fields: SHOP NUMBER, SHOP NAME and SHOP DESCRIPTION. For each catalogue, the field SHOP NUMBER gives an identifier for the catalogue, the field SHOP NAME gives a description of the shop, such as "Smith's Cookware Shop" and the field SHOP DESCRIPTION gives a description of the products listed in the catalogue.

TABLE 2

| CATEGORY |
|---|
| FIELDS |
| CATEGORY NUMBER |
| CATEGORY NAME |
| CATEGORY DESCRIPTION |

The table CATEGORY is illustrated above as Table 2. In the table CATEGORY, the fields are CATEGORY NUMBER, CATEGORY NAME and CATEGORY DESCRIPTION. For each category, the field CATEGORY NUMBER contains an identifier for that category, the field CATEGORY NAME contains the name of the category, for example, "Cutlery" and the field CATEGORY DESCRIPTION contains a description of the products in that category.

TABLE 3

| PRODUCTS |
|---|
| FIELDS |
| PRODUCT NUMBER |
| PRODUCT NAME |
| PRODUCT DESCRIPTION |
| START DATE |
| END DATE |

The table PRODUCT is illustrated above as Table 3. In the table PRODUCT, the fields are PRODUCT NUMBER, PRODUCT NAME, PRODUCT DESCRIPTION, START DATE and END DATE. For each product listed in the catalogue, the field PRODUCT NUMBER contains an identification code for the product, the field PRODUCT NAME contains the name of the product, for example "teaspoon", and the field PRODUCT DESCRIPTION contains a description of the product. The fields START DATE and END DATE give the starting dates and end dates on which the product is available.

TABLE 4

| CATEGORY-MEMBERSHIP |
|---|
| FIELDS |
| PRODUCT NUMBER |
| CATEGORY NUMBER |

The table CATEGORY-MEMBERSHIP is illustrated above as Table 4. This table serves to link products with categories. The fields in this table are PRODUCT NUMBER and CATEGORY NUMBER. In each record, the fields PRODUCT NUMBER gives the identification code for a product in the catalogue and the field in CATEGORY NUMBER gives the identification number for a category to which the product belongs. By providing a table for linking the categories and products, it is to be appreciated that a particular product can belong to two or more categories.

TABLE 5

| FEATURE |
|---|
| FIELDS |
| FEATURE NUMBER |
| FEATURE NAME |
| FEATURE DESCRIPTION |

The table FEATURE is illustrated above as Table 5. The fields in this table are FEATURE NUMBER, FEATURE NAME and FEATURE DESCRIPTION. For each record in this table, the field FEATURE NUMBER contains an identification code for the feature in the catalogue, the field FEATURE NAME gives the name of the feature, for example "stainless steel", and the field FEATURE DESCRIPTION gives a description of the feature.

TABLE 6

PRODUCT-FEATURE

FIELDS

PRODUCT NUMBER
FEATURE NUMBER
DISPLAY ORDER

The table PRODUCT-FEATURE is illustrated above as Table 6. This table links the data items contained in the tables PRODUCT and FEATURE. The fields of the table PRODUCT-FEATURE are PRODUCT NUMBER, FEATURE NUMBER and DISPLAY ORDER. For each record, the field PRODUCT NUMBER contains the identification code for a particular product or feature, the field FEATURE NUMBER contains the identification code for a particular feature and the field DISPLAY ORDER contains a sort key. As may be readily appreciated, for each product, there may be two or more features. The sort keys determine the order in which the features are displayed.

TABLE 7

PRODUCT IMAGE

FIELDS

PRODUCT NUMBER
PRODUCT IMAGE NUMBER
PRODUCT IMAGE ID

The table PRODUCT IMAGE is illustrated above as Table 7. The fields in this table are PRODUCT NUMBER, PRODUCT IMAGE NUMBER and PRODUCE IMAGE ID. In each record in this table, the field PRODUCT NUMBER contains the identification code for a particular product, the field PRODUCT IMAGE NUMBER contains an identification number for an image depicting that product and field PRODUCT IMAGE ID contains a full file identifier for the location at which the image is stored in the database 52.

TABLE 8

STOCK UNIT

FIELDS

PRODUCT NUMBER
SHOP PRODUCT CODE
MANUFACTURERS PRODUCT CODE
OFFER CODE

The table STOCK UNIT is illustrated above as Table 8. The fields in this table are PRODUCT NUMBER, SHOP PRODUCT CODE, MANUFACTURERS PRODUCT CODE and OFFER CODE. For each record, the field PRODUCT NUMBER contains the identification code for the product, the field SHOP PRODUCT CODE contains an identification for a purchase option for the product, the field MANUFACTURERS PRODUCT CODE contains the manufacturers identification code for the purchase option and the field OFFER CODE contains an identifier which links the record with a record in the table OFFER.

TABLE 9

OFFER

FIELDS

SHOP PRODUCT CODE
OFFER START DATE
OFFER END DATE
OFFER PRICE
OFFER TEXT
OFFER CODE

The table OFFER is illustrated above as Table 9. The fields of the table OFFER are SHOP PRODUCT CODE, OFFER START DATE, OFFER END DATE, OFFER PRICE, OFFER TEXT and OFFER CODE. In each record, the field SHOP PRODUCT CODE gives the identification code for the associated purchase option and the fields OFFER START DATE and OFFER END DATE define the period during which the purchase option is on sale. The field OFFER PRICE gives the price for the purchase option and the field OFFER TEXT contains text to be displayed together with the price such as "offer ends this month". The field OFFER CODE contains an identifier which links the offer with a record in the table STOCK UNIT.

TABLE 10

STOCK UNIT ATTRIBUTES

FIELDS

SHOP PRODUCT CODE
STOCK ATTRIBUTE NAME
STOCK ATTRIBUTE VALUE

The table STOCK UNIT ATTRIBUTES is illustrated above as Table 10. The fields in this table are SHOP PRODUCT CODE, STOCK ATTRIBUTE NAME and STOCK ATTRIBUTE VALUE. In each record, the field SHOP PRODUCT CODE contains the identification code for the associated purchase option, the field STOCK ATTRIBUTE NAME gives the name of a particular attribute, such as "colour" and the field STOCK ATTRIBUTE VALUE gives the value of the attribute, for example "blue".

Except for the linking tables, each table is associated with one or more templates. Each table contains control information specifying its associated templates. More specifically, each table may be associated with a first order template, one or more second order templates, one or more third order templates and higher order templates. Each of the templates can be a default template or a template created by the vendor.

Also, each record within a table can be associated with one or more templates. Where a record is associated with one or more templates, it contains control information specifying the associated templates. Templates associated with individual records are created by the vendor.

In this example, each template may be associated with only a single table.

There will now be described the operations which are performed when the user of computer 14 uses it to access the electronic catalogue stored on computer 10. The user will be referred to as the buyer.

Figure 5:
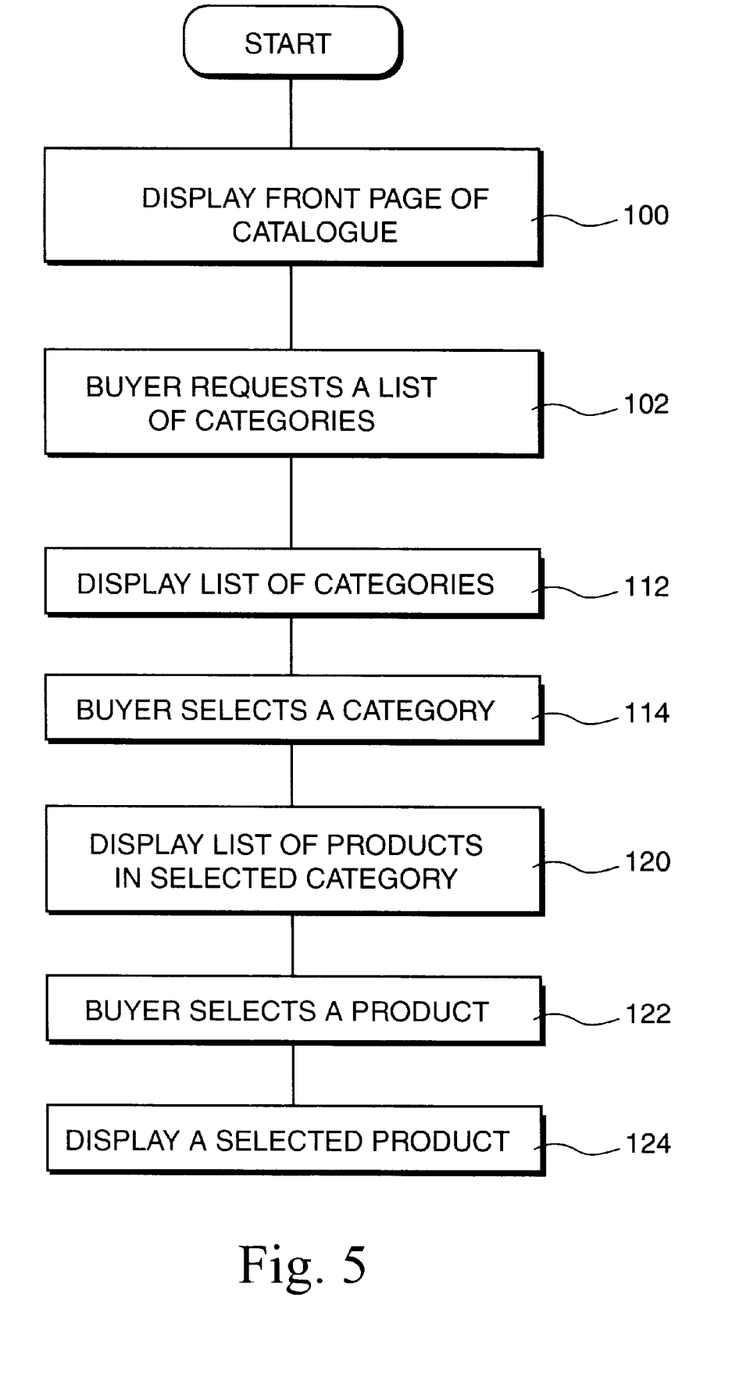
FIG. 5 is a flow-chart illustrating the operation of the electronic catalogue when it has been accessed from a computer belonging to a buyer.

Referring now to FIG. 5, initially, in step 100, with the browser 64 activated, the user enters the URL for the front page of the catalogue. This URL is transmitted to the request broker 58. The request broker 58 recognises this is a request for a fixed HTML information page and retrieves the requested page from the database 52. The request broker 58 then transmits the front page to the computer 14 where it is displayed.

Next, in a step 102, the buyer requests a list of categories of the products by clicking a mouse pointer on an appropriate hyperlink. The associated URL is transmitted to the request broker 58. The request broker 58 interprets this URL as a request for a dynamically generated information page and forwards the URL to the template manager 56. Using this URL, the template manager 56 selects and retrieves the appropriate first order template. The URL received from the request broker 58 and control information in the retrieved first order template define two search parameters. The template manager 56 transmits these search parameters to the database 52. After performing the search, the database 52 returns the list of categories of products in the catalogue to the template manager 56. Also, the database returns the identities of two second order templates. As will be explained, these identities have been extracted from control information contained in the tables which have been searched. These second order templates are retrieved. The template manager 56 then creates an information page containing the list of categories.

Figure 7:
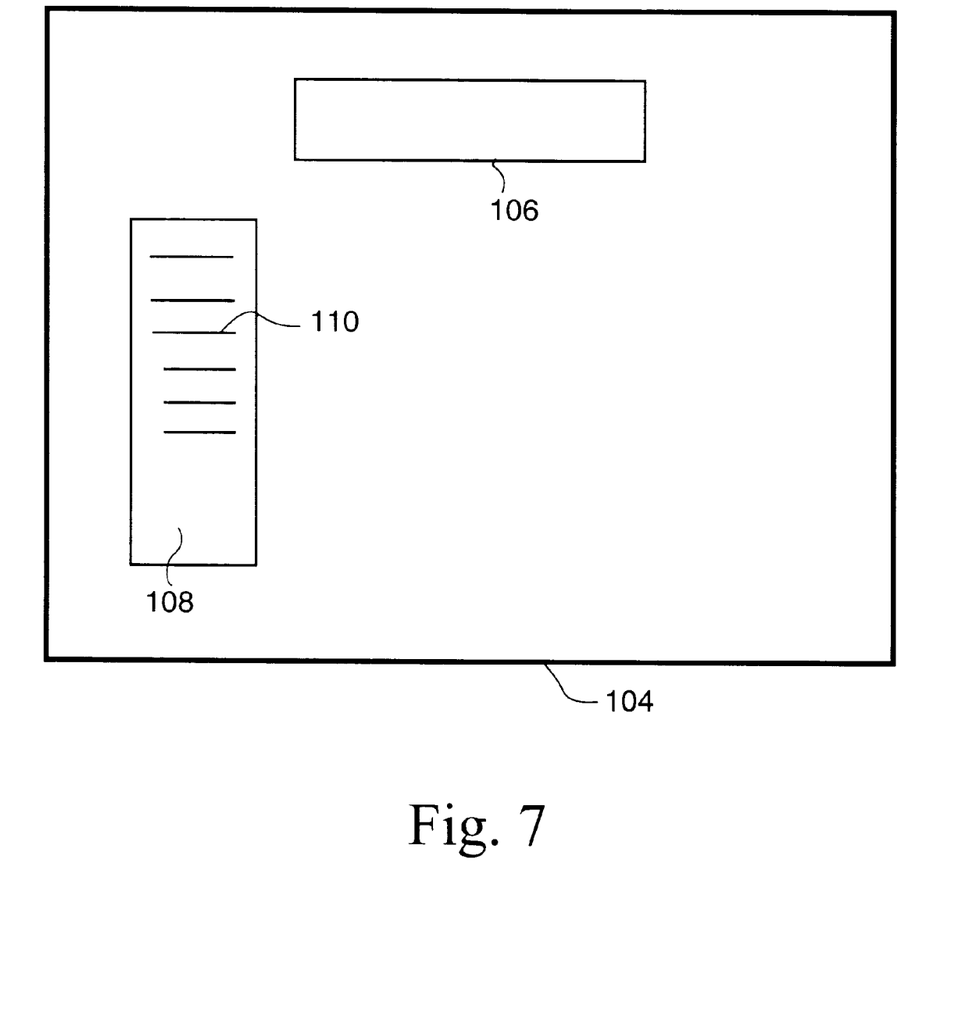

In creating this information page, the template manager 56 uses the first order template and the two second order templates which have been retrieved. The relationship of these templates is indicated in FIG. 7 where the first order template is indicated by reference numeral 104 and the two second order templates are defined by reference numerals 106 and 108. The first order template 104 defines the overall format of the page and thus specifies features such as the background colour and default values for font size and font type of any text appearing on the page. The template 104 also defines the parts of the page which are controlled by the second order templates 106 and 108. The template 106 covers the part of the page which is used to display the title of the catalogue and defines the format which is to be used. This includes the background colour, and values for the font type and font size for the text. The template 106 is specified in the table CATALOGUE. The template 108 defines the format for the part of the page which is used to show the list of categories. As well as defining features such as the background colour, font size and font type, the template 108 also defines the locations for the names of the individual categories. Each category name is displayed in the form of a hyperlink. One of the category names is indicated by reference numeral 110. The template 108 is specified in the table CATEGORY.

After the information page containing the list of categories has been created by the template manager 56, it is transmitted to the request broker 58 which, in turn, transmits it to the computer 14 where it is displayed in step 112.

Next, in a step 114, the buyer selects a particular category by clicking the mouse pointer on the appropriate hyperlink. The associated URL is transmitted to the request broker 58 which recognises it is a request for a dynamically generated page. The template manager 56 uses the URL obtained from the request broker 58 together with control information in the template 104 as parameters for instructing a search in the database 52. After the search has been performed, the database 52 returns a list of products for the selected category to the template manager 56. The database also returns the identity of a third second order template. This template is specified in the table PRODUCT. This template is retrieved. The template manager 56 then uses the list of products to create an information page showing this list.

Figure 8:
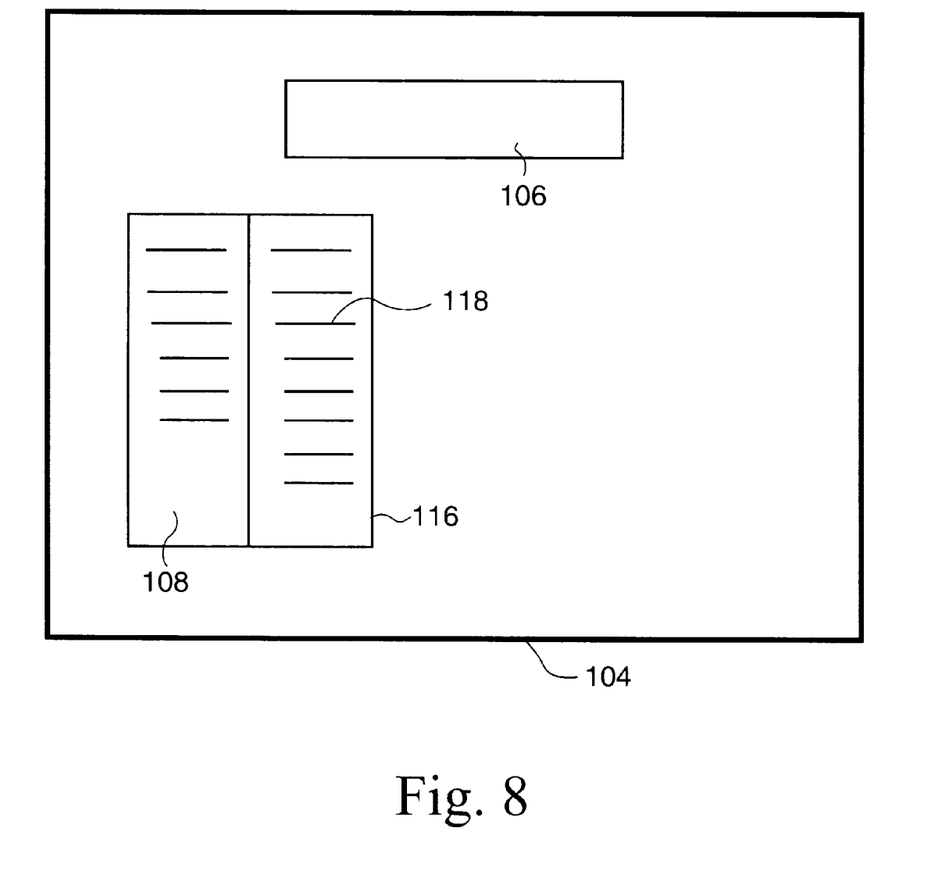

The construction of this information page is shown in FIG. 8. This page is identical to the page shown in FIG. 7 except that it contains an area for the list of products. The template 104 defines the location of this area and the third second order template mentioned above defines the format of this area. In FIG. 8, the second order template used for defining the format of this area is indicated by reference numeral 116. As well as defining the background colour, and the font size and font type used for text, the template 116 also defines the location for the name of each product. Each product is displayed as a hyperlink and one of this hyperlinks is indicated by reference numeral 118.

The created information page is then transmitted to the request broker 58, which in turn transmits it to the computer 14 where it is displayed in a step 120.

Next, in a step 122, the buyer selects a particular product by clicking the mouse pointer on the appropriate hyperlink. The associated URL is then transmitted to the request broker 58. The request broker 58 transmits this request to the template manager 56, which performs a search to retrieve data on the selected product and create an information page. This information page is transmitted to the request broker 58, which then transmits it to the computer 14 where it is displayed in a step 124.

Figure 6:
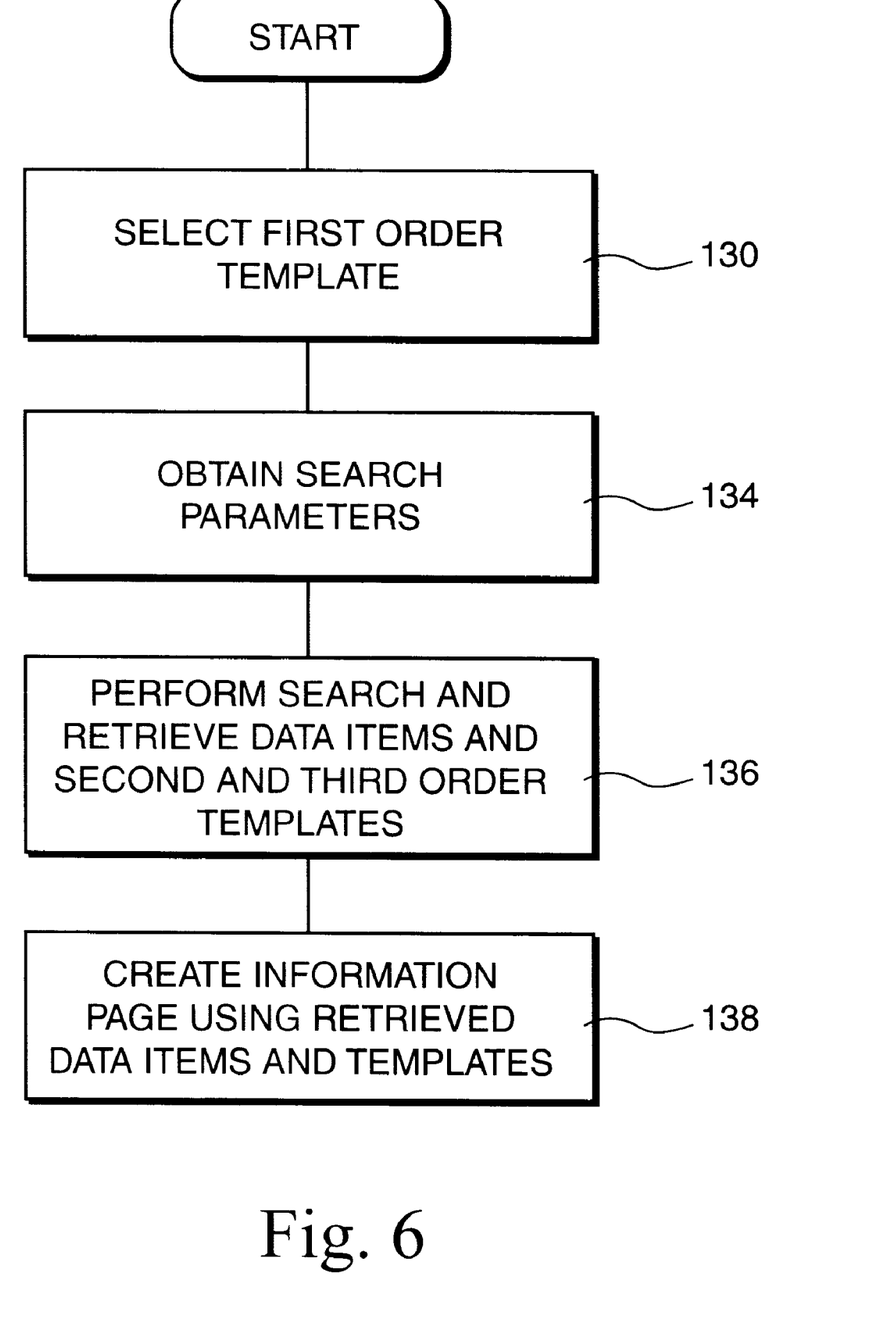
FIG. 6 is a flow-chart illustrating how an information page is generated in the electronic catalogue; and each of FIGS. 7 to 10 shows the construction of an information page produced by the electronic catalogue.

The steps which are performed by the template manager 52 in generating this information page will now be described with reference to FIG. 6.

In a step 130, the template manager 56 selects a first order template and retrieves this template from the database 52.

In a step 134, the template manager 56 uses the URL obtained from the request broker 58 and control information contained in the first order template retrieved in step 130 to define search parameters. In the step 136, it uses the search parameters to instruct the database 52 to perform a search. The database 52 then returns data items relating to the selected product to the template manager 56. The database also returns the identities of five second order templates and five third order templates. These identities have been extracted from control information contained in the tables which have been searched. These templates are retrieved.

In a step 138, the template manager 56 uses the retrieved data items together with the retrieved templates to construct the information page which shows the details of the selected products.

Figure 9:
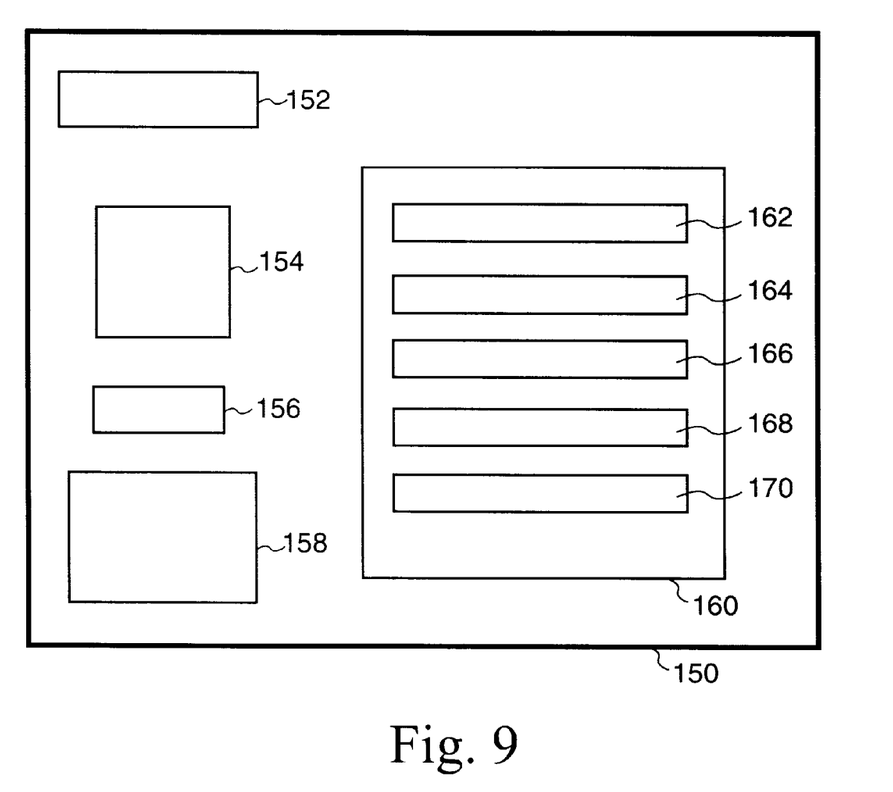

Referring now to FIG. 9, there are shown the relative locations of the templates. In FIG. 9, the main template is indicated by reference numeral 150, the five second order templates are indicated by reference numerals 152, 154, 156, 158 and 160 and the third order templates are indicated by reference numerals 162, 164, 166, 168 and 170.

The first order template 150 defines the overall format of the information page as well as the locations of the parts of the page whose format is defined by the templates 152, 154, 156, 158 and 160. Each of the second order templates 152, 154, 156, 158 and 160 is subordinate to the first order template 150.

The second order template 160 also defines the location of the portions of the page whose format is defined by the third order templates 162, 164, 166, 168 and 170. Thus, each of these third order templates is subordinate to the second order template 160.

In the created information page, the template 152 covers the part of the page where the title of the product is displayed, the template 154 covers the part of the page where an image of the product is displayed, the template 156 covers the part of the page where an attribute, such as a colour, of the product is displayed and the template 158 covers the part of the page where the price and any related text is displayed. The templates 152, 154, 156 and 158 are specified, respectively, by the tables PRODUCT, PRODUCT IMAGE, STOCK UNIT ATTRIBUTES and OFFER.

The template 160 defines the part of the page where the features of the product are displayed. In this example, five features are displayed. The templates 162, 164, 166, 168 and 170 define the format of the part of the page where a respective one of these features is displayed. These templates are specified in the table FEATURE. Some or all of the templates 152, 154, 156, 158, 160, 162, 164, 166, 168 and 170 may be specified by individual records within their respective tables.

By using second and third order templates for defining the format of individual parts of the page, it is to be appreciated that the page can have a distinctive and individual appearance. For example, each of the features can be displayed in a different manner, for example in a different colour.

When the buyer has browsed through various products which are available in the catalogue, the buyer may then select one or more of these products for purchase. The electronic catalogue provides a buyer with an electronic order form for this purpose.

FIG. 9 shows how an information page may be created by using a first order template and then second order templates within the first order template and third order template within one of the second order templates. This concept of using one or more higher order templates to define the format of a portion of the area covered by a lower order template can be taken further than shown in FIG. 9. Thus, fourth and higher order templates could be used to create an information page.

Figure 10:
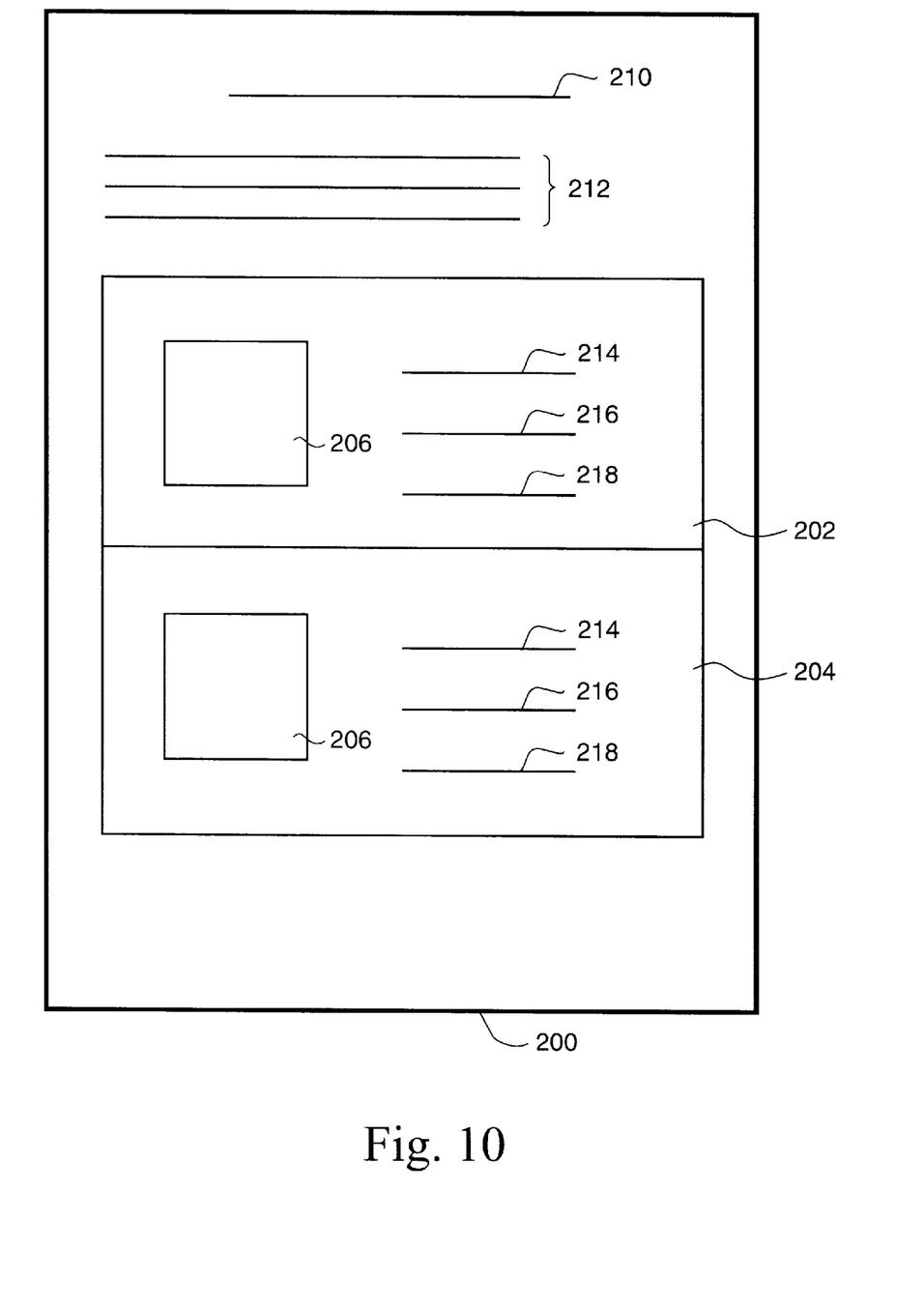

Referring now to FIG. 10, there is shown the relationship of the templates used in an alternative construction for an information page which shows a set of products in a selected category. The construction illustrated in FIG. 10 is thus an alternative to the construction shown in FIG. 8. For simplicity, FIG. 10 shows only two products, but it is to be appreciated that the construction illustrated in FIG. 10 could be used for a larger number of products.

In the construction shown in FIG. 10, there is a main or first order template 200, and two second order templates 202 and 204, each of which is used for displaying a respective one of the two products. Each of the second order templates 202, 204 contains a third order template 206. The template 200 is selected by the template manager 56 when the user selects a particular product and control information in this template together with the URL associated with the selected product are used in determining the search parameters. This template also specifies the locations of the templates 202 and 204. Each of the templates 202 and 204 is specified by the record in the table PRODUCT for the respective product. Thus, each product is displayed with an individual template. Each of the templates 202 and 204 specifies the location of the templates 206 within itself. The template 206 is specified by the table PRODUCT IMAGE.

When the information is displayed, the name of the category is displayed as indicated by line 210 and a description of the category is displayed as indicated by the lines 212. The format for the text at lines 210 and 212 is specified by the template 200.

For each product, the name of the product, the main feature of the product and the price of the product are displayed, respectively, as indicated by lines 214, 216 and 218. The format for the text at lines 214, 216 and 218 is specified by the respective one of templates 202 and 204.

Within each of the templates 202 and 204, the template 206 defines the format of the part of the page where the image of the respective product is displayed Although this invention has been described with reference to creating information pages from data items stored on the database of an electronic catalogue, it is to be appreciated that the invention can be used generally to create information pages from data items stored in a database.

What is claimed is:

1. A method of generating an information page in a computer system, said computer system including a database stored therein, said database having a set of templates and a set of data tables, each table containing a set of data items, the set of templates including a set of first order templates each for defining an overall format of an information page, and a set of second order templates each for defining a format of a part of an information page, wherein the overall format of an information page includes at least one specified area whose format is to be defined by a second order template, and wherein the database has control information associating each table or each data item with at least one second order template, said method including the steps of:

selecting a first order template;
  performing a search on said database using at least one input parameter to retrieve a set of data items;
  using the control information in the database to select at least one second order template associated with the retrieved set of data items;
  retrieving the selected second order template(s);
  using the first order template and the second order template(s) to create an information page containing a representation of the data items retrieved in the search;
  selecting at least one third order template, the or each third order template being subordinate to an associated second order template; and
  the or each third order template defining the format of a portion of a part of the information page defined by its associated second order template.

2. A method of generating an information page as claimed in claim 1, in which the parameters used to retrieve said set of data items are obtained from an input command entered by a user and control information contained in said first order template.

3. A method as claimed in claim 1, in which said data tables include a first table containing data items belonging to a first class of information, a second table containing data items belonging to a second class of information, and a table linking the data items in the first table with the data items in the second.

4. A method of generating an information page as claimed in claim 1, in which said database contains data on a set of related products or services, and the information page contains a set of data items relating to one of said categories.

5. A method of generating an information page as claimed in claim 1, in which said database contains data on a set of related products or services, and the information page contains a set of data items relating to one of said products or services.

6. A computer system for generating an information page, said computer system including: a database stored in said computer system, said database having a set of templates and a set of data tables, each table containing a set of data items, the set of templates including a set of first order templates each for defining an overall format of an information page and a set of second order templates for defining a format of part of an information page, wherein the overall format of an information page includes at least one specified area whose format is to be defined by a second order template, and wherein the database has control information associating each table or each data item with at least one second order template, said computer system being operable to:

select a first order template;

perform a search on said database using at least one input parameter to retrieve a set of data items;

use the control information in the database to automatically retrieve at least one second order template associated with the retrieved set of data items;

use the first order template and the second order template(s) to create an information page containing a representation of the data items retrieved in the search;

selecting at least one third order template, the or each third order template being subordinate to an associated second order template; and     the or each third order template defining the format of a portion of a part of the information page defined by its associated second order template.

* * * * *